(12) United States Patent
Sheem et al.

(10) Patent No.: US 8,647,768 B2
(45) Date of Patent: Feb. 11, 2014

(54) POSITIVE ACTIVE MATERIAL COMPOSITION AND POSITIVE ELECTRODE FOR ELECTROCHEMICAL DEVICE, AND ELECTROCHEMICAL DEVICE INCLUDING THE SAME

(75) Inventors: Kyeu-Yoon Sheem, Yongin-si (KR); Mee-Young Lee, Yongin-si (KR); Sumihito Ishida, Yongin-si (KR); Eui-Hwan Song, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 239 days.

(21) Appl. No.: 13/047,739

(22) Filed: Mar. 14, 2011

(65) Prior Publication Data

US 2012/0064405 A1 Mar. 15, 2012

Related U.S. Application Data

(60) Provisional application No. 61/383,122, filed on Sep. 15, 2010.

(51) Int. Cl.
*H01M 4/60* (2006.01)
(52) U.S. Cl.
USPC .......................................................... 429/213
(58) Field of Classification Search
None
See application file for complete search history.

(56) References Cited

U.S. PATENT DOCUMENTS

| 6,517,972 B1 | 2/2003 | Amatucci |
| 2009/0142665 A1* | 6/2009 | Sheem et al. ................. 429/213 |
| 2010/0226069 A1 | 9/2010 | Norieda et al. |

FOREIGN PATENT DOCUMENTS

| CN | 101188283 A | 5/2008 |
| JP | 08-213022 | 8/1996 |
| JP | 09-27344 A | 1/1997 |
| JP | 2001-110418 A | 4/2001 |
| JP | 3223523 B2 | 8/2001 |
| JP | 2002-008657 A | 1/2002 |
| JP | 2004-39443 A | 2/2004 |
| JP | 3555213 B2 | 5/2004 |
| JP | 2005-347164 A | 12/2005 |
| JP | 2005347164 A * | 12/2005 |
| JP | 2007-042602 A | 2/2007 |
| JP | 2007-251025 A | 9/2007 |
| JP | 2009-026508 A | 2/2009 |
| KR | 1020070083086 A | 8/2007 |
| KR | 10-0913178 B1 | 8/2009 |

OTHER PUBLICATIONS

Peter Harris, Imaging the atomic structure of activated carbon, Aug. 12, 2008, J Phys Condens Matter, 20, 362201 (5 pages).*
Korean Notice of Allowance dated Aug. 27, 2012, 5 pages.
Japanese Office Action dated Jun. 25, 2013 issued in connection with corresponding Japanese Patent Application No. 2011-168137, in 3 pages.
First Office Action issued on Nov. 5, 2013 by the State Intellectual Property Office of P.R. China in corresponding Chinese Application No. 201110222718.6.

* cited by examiner

*Primary Examiner* — Ula C Ruddock
*Assistant Examiner* — Daniel Gatewood
(74) *Attorney, Agent, or Firm* — Knobbe Martens Olson & Bear, LLP

(57) ABSTRACT

Disclosed are a positive active material composition for an electrochemical device, a positive electrode, and an electrochemical device including the same. The positive active material composition includes: a carbon-based additive including a hydroxyl group (—OH) and an enol group (—C=C—OH) on the surface, having a peak area ratio (OH/C=COH) of a hydroxyl group peak area and an enol group peak area of an infrared spectroscopy (FT-IR) spectrum ranging from about 0.5 to about 10, having a specific surface area of about 50 $m^2/g$ to about 3000 $m^2/g$, and having an oxygen-containing heterogeneous element in a content of less than about 15 wt %; a positive active material; a conductive material; and a binder.

17 Claims, 1 Drawing Sheet

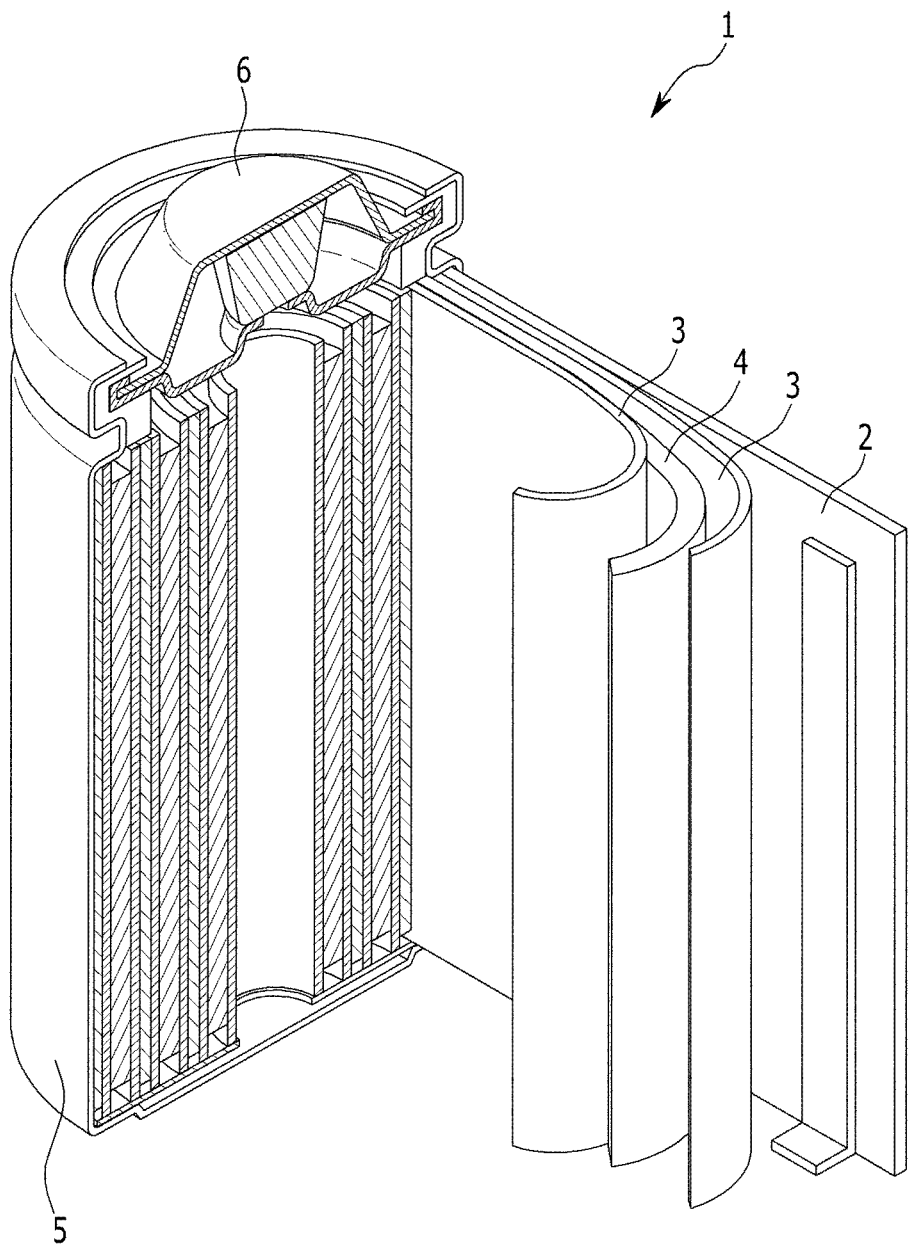

POSITIVE ACTIVE MATERIAL COMPOSITION AND POSITIVE ELECTRODE FOR ELECTROCHEMICAL DEVICE, AND ELECTROCHEMICAL DEVICE INCLUDING THE SAME

CROSS-REFERENCE TO RELATED APPLICATIONS

This application claims priority to U.S. Provisional Application No. 61/383,122, filed on Sep. 15, 2010 which is incorporated herein in its entirety.

BACKGROUND

1. Field

This disclosure relates to a positive active material composition for an electrochemical device, a positive electrode, and an electrochemical device.

2. Description of the Related Technology

Lithium rechargeable batteries have drawn attention as a power source for small portable electronic devices. Since they use an organic electrolyte, they have about twice the discharge voltage of conventional batteries using an alkali aqueous solution, and accordingly have high energy density.

As for positive active materials for a rechargeable lithium battery, lithium-transition element composite oxides being capable of intercalating lithium such as $LiCoO_2$, $LiMn_2O_4$, $LiNi_{1-x}Co_xO_2$ (0<x<1), and so on have been researched. The negative active material may include various shapes of carbonaceous materials that are capable of intercalating/deintercalating lithium, such as artificial or natural graphite, and hard carbon. However, non-carbon-based negative active materials, such as Si, considering stability, are currently being researched.

SUMMARY OF CERTAIN INVENTIVE ASPECTS

One embodiment provides a positive active material composition for an electrochemical device having excellent high rate and cycle-life characteristics.

Another embodiment provides a positive electrode for an electrochemical device fabricated using the composition.

Yet another embodiment provides an electrochemical device including a positive electrode fabricated using the composition.

According to one embodiment, a positive active material composition for an electrochemical device includes: a carbon-based additive including a hydroxyl group (—OH) and an enol group (—C=C—OH) on the surface, having a peak area ratio (OH/C=COH) of a hydroxyl group peak area and an enol group peak area of an infrared spectroscopy (FT-IR) spectrum ranging from about 0.5 to about 10, having a specific surface area of about 50 $m^2$/g to about 3000 $m^2$/g, and having an oxygen-containing heterogeneous element in a content of less than about 15 wt %; a positive active material; a conductive material; and a binder.

According to another embodiment, a positive electrode for an electrochemical device includes a current collector; and a positive active material layer formed on the current collector and including the positive active material composition.

According to another embodiment, an electrochemical device includes the positive electrode.

The electrochemical device may be a rechargeable lithium battery or a capacitor.

A positive active material composition prepared according to one embodiment of this disclosure provides an electrochemical device having excellent high rate and cycle-life characteristics.

BRIEF DESCRIPTION OF THE DRAWINGS

FIG. 1 is a schematic view showing the representative structure of a rechargeable lithium battery according to one embodiment.

DETAILED DESCRIPTION OF CERTAIN INVENTIVE EMBODIMENTS

Example embodiments will hereinafter be described in detail. However, these embodiments are only examples, and the present embodiments are not limited thereto.

A positive active material composition according to one embodiment includes a carbon-based additive, a positive active material, a conductive material, and a binder.

The carbon-based additive includes a hydroxyl group (—OH) and an enol group (—C=C—OH) bonded on the surface, and the peak area ratio (OH/COOH) of a hydroxyl group peak area and an enol group peak area of the infrared spectroscopy (FT-IR) spectrum is from about 0.5 to about 10. The peak area ratio (OH/C=COH) of the hydroxyl group peak area and the enol group peak area may be from about 0.5 to about 8. When the peak area ratio of the hydroxyl group and the enol group bonded with the carbon-based additive is about 0.5 to about 10, the specific surface area of the carbon-based additive is increased and the adsorption and desorption speed of ions may be increased, and consequently high rate charge/discharge characteristics may be improved and the reaction with an electrolyte is decreased to improve the cycle-life characteristic. Herein, the peak area signifies an integral area.

The enol group is a —C=C—OH group induced in an enol, which is also referred to as an alkenol, and is an alkene including a hydroxyl group.

Functional groups bonded with the surface of the carbon-based additive surface other than a hydroxyl group (—OH) and an enol group (—C=C—OH) include a carbonyl group (—C(=O)—), a quinone group (=O), a carboxylic acid anhydride group (—C(=O)—O—C(=O)—), and a lactone group (—C(=O)—O—).

Among the functional groups, the enol group (—C=C—OH) is a functional group having a low pKa value, for example, a strong acidic functional group. As acidic functional groups are increasingly bonded with the surface of the carbon-based additive, the activity of the functional group becomes higher. Thus, while the charge/discharge reaction proceeds, more side reactions occur due to the attack of lithium ions, and an electrolyte decomposition reaction is promoted. Therefore, more gas is generated from the electrolyte decomposition reaction and self-discharge may occur, which may lead to degradation of the cycle-life characteristic.

To solve this problem, the carbon-based additive for a positive active material composition according to one embodiment minimizes the side reactions caused by the electrolyte decomposition reaction by controlling the peak area ratio (OH/C=COH) of the hydroxyl group peak area and the enol group peak area to about 10. When the peak area ratio (OH/C=COH) exceeds 10, the electrolyte decomposition reaction may be promoted.

The electrolyte decomposition reaction of the functional group bonded with the surface of the carbon-based additive may increase the specific surface area of the carbon-based additive as functional groups are bonded therewith, and as the area contacting the electrolyte is increased due to the increased specific surface area, the decomposition reaction of an electrolyte occurs more actively. Since much gas is emitted due to the electrolyte decomposition reaction, current is consumed and the produced gas causes a physical short of an active material and a conductive material and thus an internal conduction network may become weak, which may eventually lead to a drastic deterioration of the cycle-life characteristic.

Also, when the peak area ratio (OH/C=COH) of the hydroxyl group peak area and the enol group peak area is smaller than about 0.5, the specific surface area is increased because functional groups are bonded with the surface of the carbon-based additive, and the increased specific surface area may hardly improve the adsorption/desorption speed. When the acidic functional group exists on the surface of the carbon-based additive, the acidic functional group clogs micropores of the carbon-based additive so as to suppress solvated ions from going in and out through micropores, suppress the ions from being adsorbed, and let dissolved ions go in and out through mesopores. Thus, ion adsorption is induced and adsorption and desorption speeds are increased.

Therefore, when an electrochemical device is fabricated using a positive active material composition including the carbon-based additive bonded with a functional group on the surface, an output improvement effect originating from the increase in the adsorption and desorption speeds may be acquired without deterioration in the cycle-life characteristic that may be caused by the gas generated from the reaction between the carbon-based additive and the electrolyte.

The peak area ratio may be measured through a dry method using infrared spectroscopy (FT-IR: Fourier transform infrared spectroscopy) equipment. The FT-IR dry method may measure the peak area ratio in a dry room by mixing the carbon-based additive and a material that is obtained after passing through an infrared ray, manufacturing pellets, and letting light pass through the pellets. The pellets may be manufactured at a high pressure. The material that is obtained after passing through the infrared ray may be a material that does not absorb the wavelength of the infrared region, such as KBr, but is not limited thereto. The mixing ratio of the carbon-based additive and KBr may be from about 0.3:99.7 to about 2:98 in weight % ratio.

In a spectrum obtained in the FT-IR dry method, a peak area ratio may be calculated by obtaining an integral area of the hydroxyl group (—OH) peak (a region of about 3300 to about 3650 $cm^{-1}$) and the enol group (—C=C—OH) peak (a region of about 16001620 $cm^{-1}$ to about 1620 $cm^{-1}$). The specific surface area of the carbon-based additive bonded with the functional group may range from about 50 $m^2/g$ to about 3000 $m^2/g$, and according to one embodiment, it may range from about 100 $m^2/g$ to 2500 $m^2/g$. When the specific surface area of the carbon-based additive is less than about 50 $m^2/g$, the effect of improving the adsorption/desorption speed of lithium ions is weak, and when it exceeds about 3000 $m^2/g$, there is a concern that the electrolyte decomposition reaction may be accelerated.

Also, the carbon-based additive may include a heterogeneous element including oxygen other than carbon in a content of less than about 15 wt %, and according to one embodiment, it may include the heterogeneous element in a content of about 1 wt % to about 13 wt %. In short, the carbon-based additive according to one embodiment includes carbon in a content of more than about 85 wt %, except the heterogeneous element. The heterogeneous element may be hydrogen, oxygen, nitrogen, or sulfur.

When the content of the heterogeneous element in the carbon-based additive is more than or equal to about 15 wt %, the carbon-based additive comes to have an excessive amount of functional groups and the excessive amount of functional groups may readily produce a gas.

The pKa of the carbon-based additive may range from about 3 to about 50, and according to one embodiment, it may range from about 3 to about 25.

The content of the carbon-based additive in the positive active material composition according to one embodiment may be less than about 30 wt % based on the total weight of the positive active material composition, or it may range from about 1 to about 30 wt %.

Also, in the positive active material composition according to one embodiment, the content of the carbon-based additive may fall in the range, and the mixing ratio of the carbon-based additive and the positive active material may range from about 1:99 to about 49:51 in weight ratio. When the mixing ratio of the carbon-based additive and the positive active material falls in the range, the acquired output and capacity characteristics may be excellent.

The carbon-based additive may include a carbon-based material having a specific surface area of about 100 $m^2/g$ to about 2500 $m^2/g$. Examples of the carbon-based material whose specific surface area falls in the range include activated carbon, carbide-derived carbon (CDC), carbon nanotubes, carbon nanofiber, expansion carbon, and a combination thereof. The carbide-derived carbon is carbon obtained by performing heat treatment on a carbide such as TiC and SiC. The carbon nanotubes are single wall nanotubes, multi-wall nanotubes, or a combination thereof.

When the carbon-based material has a specific surface area in the range, the electrolyte is excellently retained. Thus, a sufficient electrolyte environment may be sustained around an active material in an electrode and a quick ion transfer environment may be formed. Therefore, a high rate characteristic may be improved. Also, since the electrolyte retention capability prevents the electrolyte from being dried up in the electrode and sustains the ion transfer environment around an active material while a charge and discharge cycle proceeds, it improves the cycle-life.

The carbon-based additive may be prepared by performing a surface treatment in a method selected from the group consisting of ion beam treatment, plasma treatment, ozone treatment, acid treatment, and a combination thereof, and performing a heat treatment.

Through the surface treatment, a functional group is bonded with the surface of the carbon-based material. Among the functional group, the conditions of the surface treatment process are controlled in such a manner that the peak area ratio (OH/C=COH) of the hydroxyl group peak area and the enol group peak area ranges from about 0.5 to about 10.

Hereafter, an ozone process and an acid process among the surface treatment methods are described. When the ozone process is performed, a carbon-based material is dried, and the dried carbon-based material is allowed to stand for about 1 hour to about 10 hours in a condition of generating ozone in a content of about 5 g/hr to about 20 g/hr in a concentration of about 3 mg/l to about 10 mg/l.

Also, the acid treatment process may be performed by impregnating a carbon-based material with acid. Herein, the available acid includes nitric acid, hydrochloric acid, sulfuric acid, hydrofluoric acid, and a combination thereof. The acid may be used in the form of an aqueous solution.

The heat treatment process may include transferring a surface-treated carbon material into a furnace and performing a heat treatment at a temperature of about 230° C. to about 350°

C. for about 10 minutes to about 5 hours. According to another embodiment, the temperature for the heat-treatment may be from about 230° C. to about 270° C.

The heat treatment process may be performed by increasing a temperature at an increasing rate of about 1° C./min to 10° C./min from room temperature to about 230° C. to about 350° C.

As for the furnace, any one capable of increasing the temperature in the above-described condition may be used.

The heat treatment process may be performed in an inert atmosphere such as one of nitrogen or argon.

When the heat treatment is performed in the condition, the —C=C—OH group bonded with the surface of the carbon-based additive is discharged in the form of $CO_2$. Thus, the number of —C=C—OH groups bonded with the surface may be effectively controlled, and as a result, an appropriate peak area ratio may be acquired.

In the positive active material composition according to one embodiment, the positive active material may include lithiated intercalation compounds that reversibly intercalate and deintercalate lithium ions. Examples of the positive active material include a composite oxide including at least one selected from the group consisting of cobalt, manganese, and nickel, as well as lithium. In one embodiment, the following lithium-containing compounds may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above Chemical Formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The positive active material may include the positive active material with the coating layer, or a compound of the active material and the active material coated with the coating layer. The coating layer may include at least one coating element compound selected from the group consisting of an oxide of the coating element and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and combinations thereof. The coating process may include any conventional processes as long as it does not causes any side effects on the properties of the positive active material (e.g., spray coating, immersing), which is well known to persons having ordinary skill in this art, so a detailed description thereof is omitted.

In the positive active material composition according to one embodiment, the positive active material may be included in an amount of 90 to 40 wt % based on a solid entire weight of the positive active material composition.

The binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, nylon, and the like, but is not limited thereto. In the positive active material composition according to one embodiment, the binder may be included in an amount of 5 wt % to 10 wt % based on the entire solid weight of the positive active material composition.

The conductive material improves electrical conductivity of a negative electrode. Any electrically conductive material can be used as a conductive agent unless it causes a chemical change. Examples of the conductive material include natural graphite, artificial graphite, carbon black, acetylene black, ketjen black, a carbon fiber, a metal powder or metal fiber of copper, nickel, aluminum, silver, and the like, or a conductive material such as a polyphenylene derivative may be mixed with at least one of the conductive materials. In the positive active material composition according to one embodiment, the conductive material may be included in an amount of 1 wt % to 10 wt % based on the entire solid weight of the positive active material composition.

Such a positive active material composition may be applied to an electrochemical device. The electrochemical device may be any one being capable of operating at from about 2V to about 5V, for example a rechargeable lithium battery or a capacitor.

When the positive active material composition is applied to a rechargeable lithium battery, the rechargeable lithium battery includes a positive electrode, a negative electrode, and an electrolyte.

The positive electrode is fabricated using the positive active material composition, and includes a current collector and a positive active material layer. The current collector may include Al, but is not limited thereto. The positive active material layer may be fabricated by coating the positive active material composition, which is mixed in an organic solvent such as N-methyl pyrrolidone, on a current collector. The positive electrode manufacturing method is well known and thus is not described in detail in the present specification.

The negative electrode may include a current collector and a negative active material layer disposed on the current collector, and the negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material. The carbon material may be any generally-used carbon-based negative active material for a lithium ion rechargeable battery. Examples of the carbon material include crystalline carbon, amorphous carbon, and a mixture thereof. The crystalline carbon may be non-shaped, or sheet, flake, spherical, or fiber shaped natural graphite or artificial graphite. The amorphous carbon may be a soft carbon, a hard carbon, mesophase pitch carbide, fired coke, and the like.

Examples of the lithium metal alloy includes lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si-Q alloy (where Q is an element selected from the group consisting of an alkaline metal, an alkaline-earth metal, a group 13 element, a group 14 element, a transition element, a rare earth element, and combinations thereof, and is not Si), Sn, $SnO_2$, a Sn—R alloy (where R is an element selected from the group consisting of an alkaline metal, an alkaline-earth metal, a group 13 element, a group 14 element, a transition element, a rare earth element, and combinations thereof, and is not Sn), and mixtures thereof. At least one of these materials may be mixed with $SiO_2$. The elements Q and R are the same or different, and are independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

In the negative active material layer, the negative active material may be included in an amount of about 95 wt % to about 99 wt % based on the total weight of the negative active material layer.

The negative active material layer includes a binder, and optionally a conductive material. The negative active material layer may include about 1 wt % to about 5 wt % of a binder based on the total weight of the negative active material layer. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves properties for binding active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of about 0.1 to about 3 parts by weight based on 100 parts by weight of the binder.

The conductive material may be any conductive material that is generally used for a rechargeable lithium battery. Examples of the conductive material include a carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as polyphenylene derivative, and the like; or a mixture thereof.

The current collector includes a copper foil, a nickel foil, a stainless steel foil, a titanium foil, a nickel foam, a copper foam, a polymer substrate coated with a conductive metal, or combinations thereof.

The non-aqueous electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the chain carbonate are mixed together in a volume ratio of about 1:1 to about 1:9. When the mixture is used as an electrolyte, the electrolyte performance may be enhanced.

In addition, the non-aqueous organic electrolyte may further include the mixture of a carbonate-based solvent and an aromatic hydrocarbon-based solvent. The carbonate-based solvent and the aromatic hydrocarbon-based solvent may be mixed together in a volume ratio ranging from about 1:1 to about 30:1.

The aromatic hydrocarbon-based organic solvent may be represented by the following Chemical Formula 1.

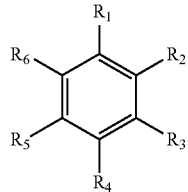

[Chemical Formula 1]

In Chemical Formula 6, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate, an ethylene carbonate-based compound of the following Chemical Formula 2, or a combination thereof in order to improve cycle-life.

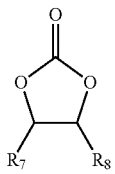

[Chemical Formula 2]

In Chemical Formula 2, $R_7$ and $R_8$ are independently selected from the group consisting of hydrogen, a halogen, a cyano group (CN), a nitro group ($NO_2$), and a C1 to C5 fluoroalkyl group, provided that at least either of $R_7$ and $R_8$ is selected from the group consisting of a halogen, a cyano group (CN), a nitro group ($NO_2$), and a C1 to C5 fluoroalkyl group, and both $R_7$ and $R_8$ are not hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle-life may be adjusted within an appropriate range.

The lithium salt is dissolved in an organic solvent, supplies lithium ions in the battery, operates basic operation of a rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

The rechargeable lithium battery may further include a separator between the negative electrode and the positive electrode, as needed. Non-limiting examples of suitable separator materials include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

FIG. 1 provides a schematic view showing the representative structure of a rechargeable lithium battery according to one embodiment. As shown in FIG. 1, the rechargeable lithium battery 1 includes a battery case 5 including a positive electrode 3, a negative electrode 2, and a separator interposed between the positive electrode 3 and the negative electrode 2, an electrolyte solution impregnated therein, and a sealing member 6 sealing the battery case 5.

The following examples illustrate the present embodiments in more detail. These examples, however, are not in any sense to be interpreted as limiting the scope of this disclosure.

Comparative Example 1

A carbon-based additive was prepared through a hydrogen reduction process by adding an activated carbon having a surface area of about 1500 m$^2$/g in a mixed solution (1:1: volume ratio) of nitric acid, hydrochloric acid, and distilled water, performing the process for about 5 hours, rinsing the acquired product with distilled water, and drying the acquired product at a temperature of about 120° C.

Example 1

About 10 g of activated carbon having a surface area of about 1500 m$^2$/g was added to about 1000 ml of a solution of sulfuric acid:nitric acid (3:1 volume ratio), processed for about 5 hours, rinsed with distilled water, and dried at a temperature of about 120° C. A carbon-based additive was prepared by putting the acquired product into a furnace of which the temperature was controlled to increase at a rate of about 1° C./min until the temperature reached 250° C., and performing heat treatment in a nitrogen inert atmosphere at about 250° C. for about 3 hours.

A positive active material slurry was prepared by mixing about 85 wt % of a mixture of $LiCoO_2$ and the prepared carbon-based additive, about 5 wt % of ketjen black conductive material, and about 10 wt % of polyvinylidene fluoride in an N-methylpyrrolidone solvent. Herein, the mixing ratio of the $LiCoO_2$ and the carbon-based additive was about 80:20 in weight ratio.

A positive electrode was fabricated in a typical method of coating an aluminum foil with the positive active material slurry.

A pouch-type half-cell was manufactured using the positive electrode, a lithium metal counter electrode, and an electrolyte solution. As for the electrolyte solution, a mixed solvent (3:3:1 volume ratio) of ethylene carbonate including about 1.3M LiPF$_6$ dissolved therein, dimethyl carbonate, and diethyl carbonate was used.

Example 2

Activated carbon having a surface area of about 1500 m$^2$/g was allowed to stand for about 30 minutes and treated with ozone in a condition that the ozone was generated in a concentration of about 5 mg/l in an amount of about 10 g/hr. A carbon-based additive was prepared by performing heat treatment on the ozone-treated activated carbon in a furnace of which the temperature was controlled to increase at a rate of about 1° C./min in a nitrogen inert atmosphere to about 250° C. for about 2 hours.

A half-cell was manufactured according to the same method of Example 1, except that the carbon-based additive prepared according to the above process was prepared.

Example 3

A carbon-based additive was prepared according to the same method of Example 1 using activated carbon whose surface area was about 2500 m$^2$/g. A half-cell was manufactured according to the same method of Example 1 using the above-prepared carbon-based additive.

Example 4

A carbon-based additive was prepared according to the same method of Example 1, except that multi-wall nanotubes (MWNT) having a surface area of about 350 m$^2$/g were used instead of activated carbon. A half-cell was manufactured according to the same method of Example 1, except that the above-prepared carbon-based additive was used.

Example 5

A carbon-based additive was prepared according to the same method of Example 1, except that carbide-derived carbon (CDC) having a surface area of about 800 m$^2$/g, which was prepared according to a method disclosed in Nanotechnology for Energy, A.J. Drexel Nanotechnology Institute, and Dept. Materials Science & Engineering, Drexel University, Philadelphia, Nano-Forum, Nov. 14, 2006, was used instead of activated carbon. A half-cell was manufactured according to the same method of Example 1, except that the above-prepared carbon-based additive was used.

Comparative Example 2

A positive active material slurry was prepared by mixing about 85 wt % of LiCoO$_2$, about 5 wt % of ketjen black conductive material, and about 10 wt % of polyvinylidene fluoride in an N-methylpyrrolidone solvent. A positive electrode was fabricated by coating an aluminum foil with the positive active material slurry.

A pouch-type half-cell was manufactured using the positive electrode, a lithium metal counter electrode, and an electrolyte. As for the electrolyte, a mixed solvent (3:3:1 volume ratio) of ethylene carbonate including about 1.3M of LiPF$_6$ dissolved therein, dimethyl carbonate, and diethyl carbonate was used.

Comparative Example 3

A half-cell was manufactured according to the same method of Example 1 using a carbon-based additive prepared by performing heat treatment to activated carbon whose surface area was about 1500 m$^2$/g and in a nitrogen inert atmosphere at about 1200° C. for 5 hours. Through the heat treatment process, all the functional groups were removed from the surface of the carbon-based additive.

Comparative Example 4

A half-cell was manufactured according to the same method of Example 1, except that soft carbon was used instead of carbon-based additive.

Comparative Example 5

A half-cell was manufactured according to the same method of Example 1, except that graphite was used instead of the carbon-based additive.

The peak area ratio, element analysis, and specific surface area of the carbon-based additives prepared according to Examples 1 and 3-5 and Comparative Examples 1 to 5 were measured, and the measurement results are shown in the following Table 1. Also, the high rate characteristic and cycle-life characteristic of the half-cells manufactured according to Examples 1 and 3-5 and Comparative Examples 1 to 5 were measured and the measurement results are shown in the following Table 1.

The measurement methods were as follows.

1) Peak Area Ratio

Pellets were manufactured by mixing about 1 wt % of a carbon-based additive and about 99 wt % of KBr.

An integral area of a hydroxyl group (—OH) peak observed at about the 3500 cm$^{-1}$ region and an integral area of an enol group (—C=C—OH) peak observed at about the 1610 cm$^{-1}$ region were obtained by using the pellets and performing FT-IR analysis by passing light therethrough. The integral area of the hydroxyl group peak and the integral area of the enol group peak were measured, and a peak area ratio was obtained.

The peak area ratio is presented in the following Table 1.

2) Element Analysis

Element analysis was performed using about 10 mg of a carbon-based additive and an automatic element analyzer (Product name: EA 1110 CHNS-O, produced by CE Instruments, and the analysis was performed after reduction at about 1800° C.).

Among the element analysis values, the weight % of carbon is shown in the following Table 1. Excluding the weight % of carbon shown in the following Table 1, the weight % of a heterogeneous element included in the carbon-based additive is obtained.

3) Specific Surface Area

Specific surface area was obtained using about 20 mg of the carbon-based additive through a nitrogen adsorption/desorption (BET) test.

4) Rate Capability

A half-cell was charged/discharged one time at 1C, and then 5C charge, 1C discharge, 10C charge, 1C discharge, 20C charge, 1C discharge, 50C charge, and 1C discharge were performed. Subsequently, 1C charge, 1C discharge, 1C charge, 5C discharge, 1C charge, 10C discharge, 1C charge, 20C discharge, 1C charge, and 50C discharge were performed again.

Herein, 1C discharge capacity and the discharge capacity according to each charge/discharge rate (C-rate) were measured, and a percent (%) for 1C discharge capacity was calculated.

5) Cycle-Life Characteristic

After a half-cell was charged/discharged 50 times at 10C, the capacity retention rate (%) of discharge capacity for 100-time charge and discharge with respect to discharge capacity for one-time charge and discharge was calculated, and the calculation result is shown as cycle-life (%) in the following Table 1.

bility of the carbon-based additives prevents the electrolyte from being dried out, which may occur as cycles are repeated, and sustains the ion transfer environment around the active material. Therefore, it also improves the cycle-life characteristic.

Also, when the carbon-based additive of Example 1 is compared with that of Comparative Example 1, it may be seen

TABLE 1

| | Carbon-based additive | Peak area ratio (OH/COOH) | Element analysis carbon (wt %) | BET specific surface area ($m^2/g$) | Rate capability | | | | 10 C cycle 50th cycle-life (%) |
| | | | | | 5 C/1 C (%) | 10 C/1 C (%) | 20 C/1 C (%) | 50 C/1 C (%) | |
|---|---|---|---|---|---|---|---|---|---|
| Comparative Example 1 | activated carbon | 1.1 | 86 | 1500 | 94 | 85 | 21 | 9 | 5 |
| Example 1 | activated carbon | 1.34 | 93 | 1500 | 96 | 89 | 52 | 24 | 85 |
| Example 2 | activated carbon | 2.46 | 95 | 1500 | 94 | 86 | 50 | 18 | 82 |
| Example 3 | activated carbon | 3.68 | 94 | 2500 | 95 | 87 | 43 | 15 | 83 |
| Example 4 | MWNT | 4.80 | 93 | 350 | 95 | 84 | 31 | 19 | 83 |
| Example 5 | CDC | 2.03 | 98 | 800 | 94 | 83 | 42 | 19 | 85 |
| Comparative Example 2 | None | None | None | None | 91 | 88 | 25 | 4 | 27 |
| Comparative Example 3 | activated carbon | 12.1 | >99 | 1500 | 92 | 81 | 29 | 8 | 57 |
| Comparative. Example 4 | soft carbon | 1.94 | >99 | 14 | 93 | 82 | 20 | 6 | 48 |
| Comparative Example 5 | graphite | 1.47 | >99 | 2 | 93 | 84 | 23 | 6 | 53 |

It may be seen from Table 1 that the carbon-based additives prepared according to Examples 1, and 3-5, and Comparative Examples 3 to 5 include hydroxyl groups (—OH) and enol groups (—C=C—OH).

As shown in Table 1, for the carbon-based additives of Examples 1-5, the carbon content ranges from about 93 wt % to about 98 wt %. Therefore, it may be seen that the carbon-based additives includes heterogeneous elements other than carbon in the contents of about 7 wt % to about 2 wt %. From this result, the amount of functional groups including oxygen or hydrogen and existing in the carbon-based additive other than carbon may be estimated.

Also, in the case of the carbon-based additives of Comparative Examples 3 to 5, the carbon content exceeds about 99 wt %. Therefore, it may be estimated that most of the carbon-based additives include carbon and the carbon-based additives scarcely include functional groups.

Also, the FT-IR results of the carbon-based additives reveal the existence of the hydroxyl group (—OH) and the enol group (—C=C—OH), and the relative amount thereof.

Further, the carbon-based additive of Comparative Example 1 had a capacity retention rate of about 5%, which indicates that the cycle-life characteristic is remarkably deteriorated. When the carbon content of a carbon-based additive is lower than about 90 wt %, for example, when the amount of functional groups bonded with the surface is large, gas emission occurs due to a side reaction during an electrochemical reaction and thus the pouch-type battery is swollen. As a result, the cycle-life characteristic is seriously deteriorated.

In addition, it may be seen that the carbon-based additives of Examples 1 to 5 had excellent high power characteristics, and as activated carbon positioned around an active material had many pores and a large surface area, a sufficient electrolyte solution environment may be sustained around the active material and thereby a quick ion transfer environment is formed based on high power. The electrolyte refilling capathat although the same activated carbon was used, a carbon-based additive including a more appropriate functional group on the surface was advantageous for high power.

From the results shown in Table 1, it may be understood that, whereas the carbon-based additive bonded with an excessive amount of functional groups emitted gas through an electrochemical reaction so as to cause an electrode plate delamination phenomenon or a battery swelling phenomenon, a carbon-based additive including an appropriate amount of functional groups provided an electronic environment and surface area favorable for ion adsorption without any serious side effects.

While this disclosure has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. A positive active material composition for an electrochemical device, comprising:
   a carbon-based additive including a hydroxyl group (—OH) and an enol group (—C=C—OH) on the surface, having a peak area ratio (OH/C=COH) of a hydroxyl group peak area and an enol group peak area of an infrared spectroscopy (FT-IR) spectrum ranging from about 0.5 to about 10, having a specific surface area of about 50 $m^2/g$ to about 3000 $m^2/g$, and having heterogeneous element other than carbon in a content of less than about 15 wt %;
   a positive active material;
   a conductive material; and
   a binder;

wherein the carbon-based additive includes the heterogeneous element in a content of about 1 wt % to about 13 wt % and carbon in a content of about 87 wt % to 99 wt %.

2. The positive active material composition of claim 1, wherein a content of the carbon-based additive is less than about 30 wt % based on the total weight of the positive active material composition.

3. The positive active material composition of claim 1, wherein a content of the carbon-based additive ranges from about 1 wt % to about 30 wt % based on a total weight of the positive active material composition.

4. The positive active material composition of claim 1, wherein the carbon-based additive is one selected from the group consisting of activated carbon, carbide derived carbon (CDC), carbon nanotubes, carbon nanofiber, expansion carbon, and a combination thereof.

5. The positive active material composition of claim 1, wherein the carbon-based additive is prepared through a method selected from the group consisting of an ion beam method, a plasma method, an ozone treatment method, an acid treatment method, and a combination thereof.

6. The positive active material composition of claim 1, wherein the carbon-based additive has a specific surface area ranging from about 100 $m^2/g$ to about 2500 $m^2/g$.

7. The positive active material composition of claim 1, wherein the electrochemical device is operated at about 2V to about 5V.

8. The positive active material composition of claim 1, wherein the positive active material composition is applied to a rechargeable lithium battery or a capacitor.

9. A positive electrode for an electrochemical device, comprising:
   a current collector; and
   a positive active material layer formed on the current collector,
   wherein the positive active material layer comprises a positive active material composition comprising a carbon-based additive including a hydroxyl group (—OH) and an enol group (—C═C—OH) on the surface, having a peak area ratio (OH/C═COH) of a hydroxyl group peak area and an enol group peak area of an infrared spectroscopy (FT-IR) spectrum ranging from about 0.5 to about 10, having a specific surface area of about 50 $m^2/g$ to about 3000 $m^2/g$, and having containing heterogeneous element other than carbon in a content of less than about 15 wt %;
   a positive active material; a conductive material; and a binder,
   wherein the carbon-based additive includes the heterogeneous element in a content of about 1 wt % to about 13 wt % and carbon in a content of about 87 wt % to 99 wt %.

10. The positive electrode of claim 9, wherein a content of the carbon-based additive is less than about 30 wt % based on the total weight of the positive active material composition.

11. The positive electrode of claim 9, wherein a content of the carbon-based additive ranges from about 1 wt % to about 30 wt % based on a total weight of the positive active material composition.

12. The positive electrode of claim 9, wherein the carbon-based additive is one selected from the group consisting of activated carbon, carbide derived carbon (CDC), carbon nanotubes, carbon nanofiber, expansion carbon, and a combination thereof.

13. The positive electrode of claim 9, wherein the carbon-based additive is prepared through a method selected from the group consisting of an ion beam method, a plasma method, an ozone treatment method, an acid treatment method, and a combination thereof.

14. The positive electrode of claim 9, wherein the carbon-based additive has a specific surface area ranging from about 100 $m^2/g$ to about 2500 $m^2/g$.

15. The positive electrode of claim 9, wherein the electrochemical device is operated at about 2V to about 5V.

16. The positive electrode of claim 9, wherein the positive electrode is applied to a rechargeable lithium battery or a capacitor.

17. An electrochemical device, comprising:
   a positive electrode of claim 9;
   a negative electrode including a negative active material; and
   a non-aqueous electrolyte.

* * * * *